(12) United States Patent
Attar

(10) Patent No.: US 7,179,406 B1
(45) Date of Patent: Feb. 20, 2007

(54) METHOD AND APPARATUS FOR MAKING REFLECTIVE PAVEMENT MARKER

(76) Inventor: Adil H. Attar, P.O. Box 3883, Ontario, CA (US) 91761

( * ) Notice: Subject to any disclaimer, the term of this patent is extended or adjusted under 35 U.S.C. 154(b) by 142 days.

(21) Appl. No.: 10/796,838

(22) Filed: Mar. 8, 2004

(51) Int. Cl.
*B29D 11/00* (2006.01)
*E01F 9/06* (2006.01)

(52) U.S. Cl. .......................................... 264/1.9; 404/6
(58) Field of Classification Search ............... 404/6, 404/11, 12, 14, 15, 16, 72; 264/1.9
See application file for complete search history.

(56) References Cited

U.S. PATENT DOCUMENTS

| | | | | |
|---|---|---|---|---|
| 3,409,344 A * | 11/1968 | Balint et al. | ................. | 359/531 |
| 5,354,143 A * | 10/1994 | Lindner | .......................... | 404/9 |
| 5,470,170 A * | 11/1995 | Lindner | .......................... | 404/9 |
| 5,857,801 A * | 1/1999 | Brown | ......................... | 404/11 |
| 5,981,032 A * | 11/1999 | Smith et al. | ................. | 428/167 |
| 6,010,609 A * | 1/2000 | Mimura et al. | ............... | 205/70 |
| 6,120,280 A * | 9/2000 | Mimura et al. | ............. | 425/195 |
| 6,267,530 B1 * | 7/2001 | Attar | .......................... | 404/16 |
| 6,334,734 B1 * | 1/2002 | Attar | .......................... | 404/16 |
| 6,579,036 B2 * | 6/2003 | Attar | .......................... | 404/16 |
| 6,698,972 B1 * | 3/2004 | Attar | .......................... | 404/16 |
| 6,811,729 B2 * | 11/2004 | Attar | .......................... | 264/1.9 |
| 6,821,051 B2 * | 11/2004 | Attar | .......................... | 404/16 |
| 2001/0045675 A1 * | 11/2001 | Attar | .......................... | 264/1.9 |
| 2003/0059256 A1 * | 3/2003 | Gallup et al. | ................. | 404/16 |
| 2003/0194270 A1 * | 10/2003 | Forrer | .......................... | 404/9 |
| 2005/0018292 A1 * | 1/2005 | Mimura et al. | ............. | 359/529 |
| 2005/0180012 A1 * | 8/2005 | Smith | ......................... | 359/530 |

* cited by examiner

*Primary Examiner*—Raymond Addie

(57) ABSTRACT

An apparatus and a method are provided for fabricating a one-piece, polymeric raised reflective pavement marker.

The apparatus includes a polished cavity segment which have an inclined angular disposition with respect to the mold base horizontal and vertical surfaces; and a core segment having the same inclined disposition correspondingly to the cavity segment, said core segment having at least the top portions polished which can be integrally formed including the electroformed molding used for embossing a precision pattern of prismatic or micro-prismatic cube corner reflective elements.

In another preferred apparatus, the entire upper, inclined portion of the core can be made of two parts, a body segment and a polished electroformed segment that is firmly mounted and fixed onto a designated raised regions of the core's body segment. The embossing process and the subsequent forming of said monolithically made one-piece reflective marker is based on accurately positioning the cavity and core segments of said apparatus within a base to be mounted in an injection molding machine. The angular position of the core segments allows integrally forming of the inclined hollow cavities within the pavement marker structural body; thereby facilitate the draft needed to eject the pavement markers.

1 Claim, 6 Drawing Sheets

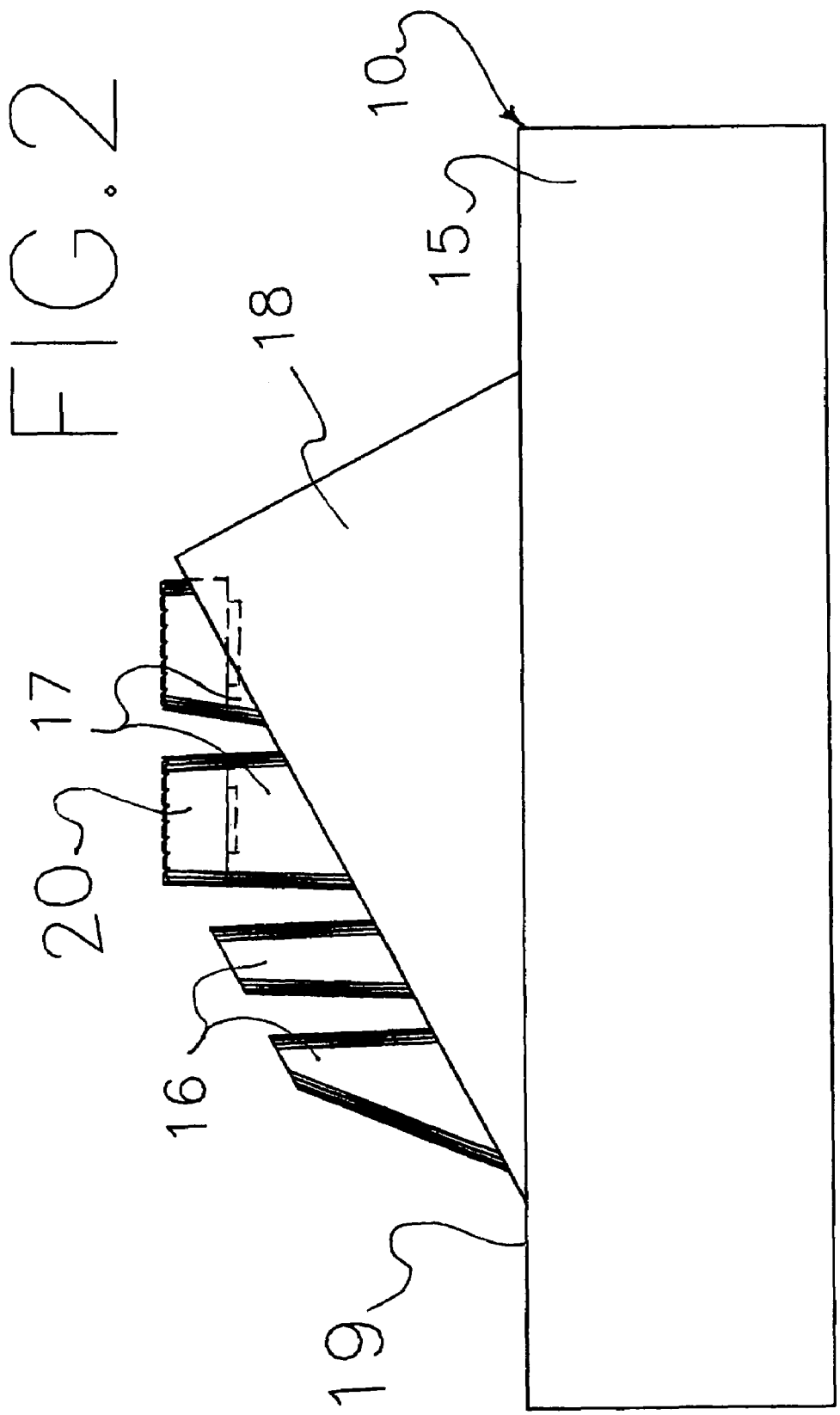

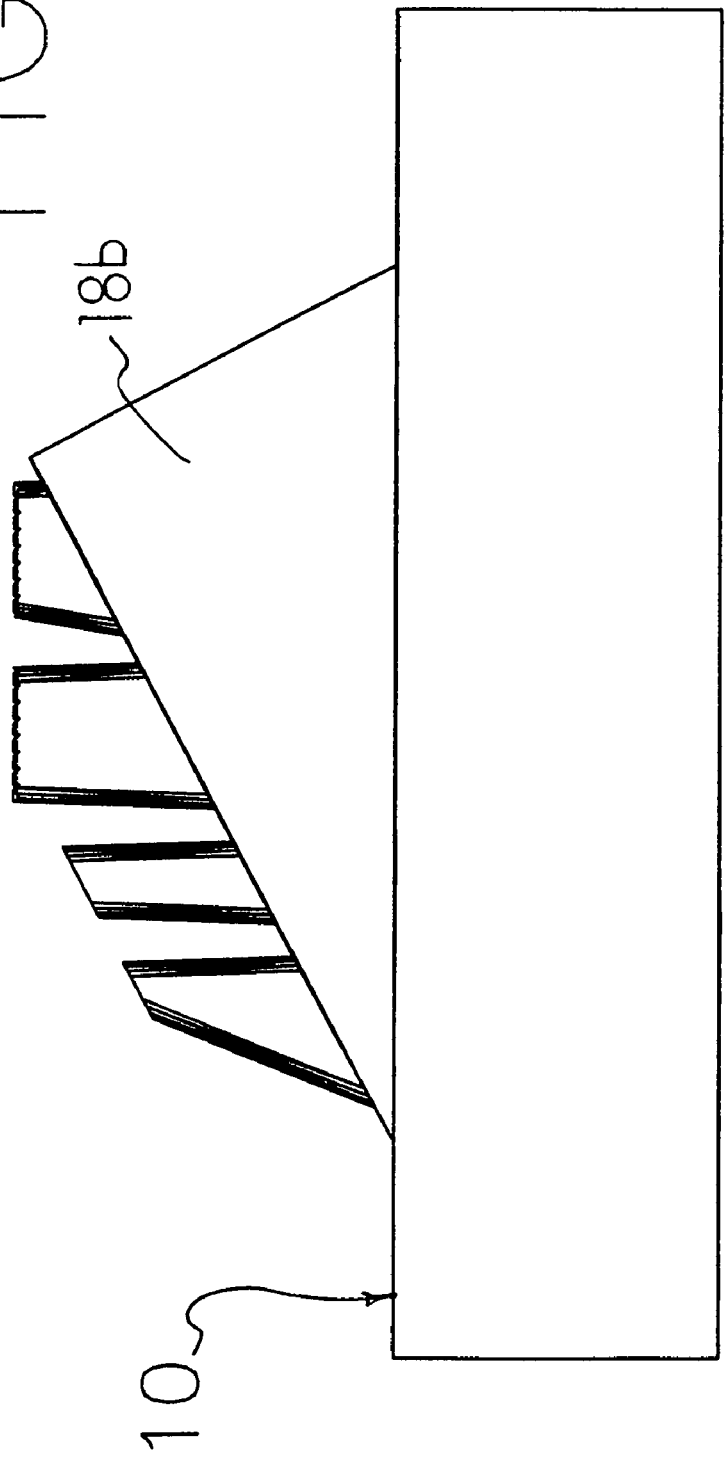

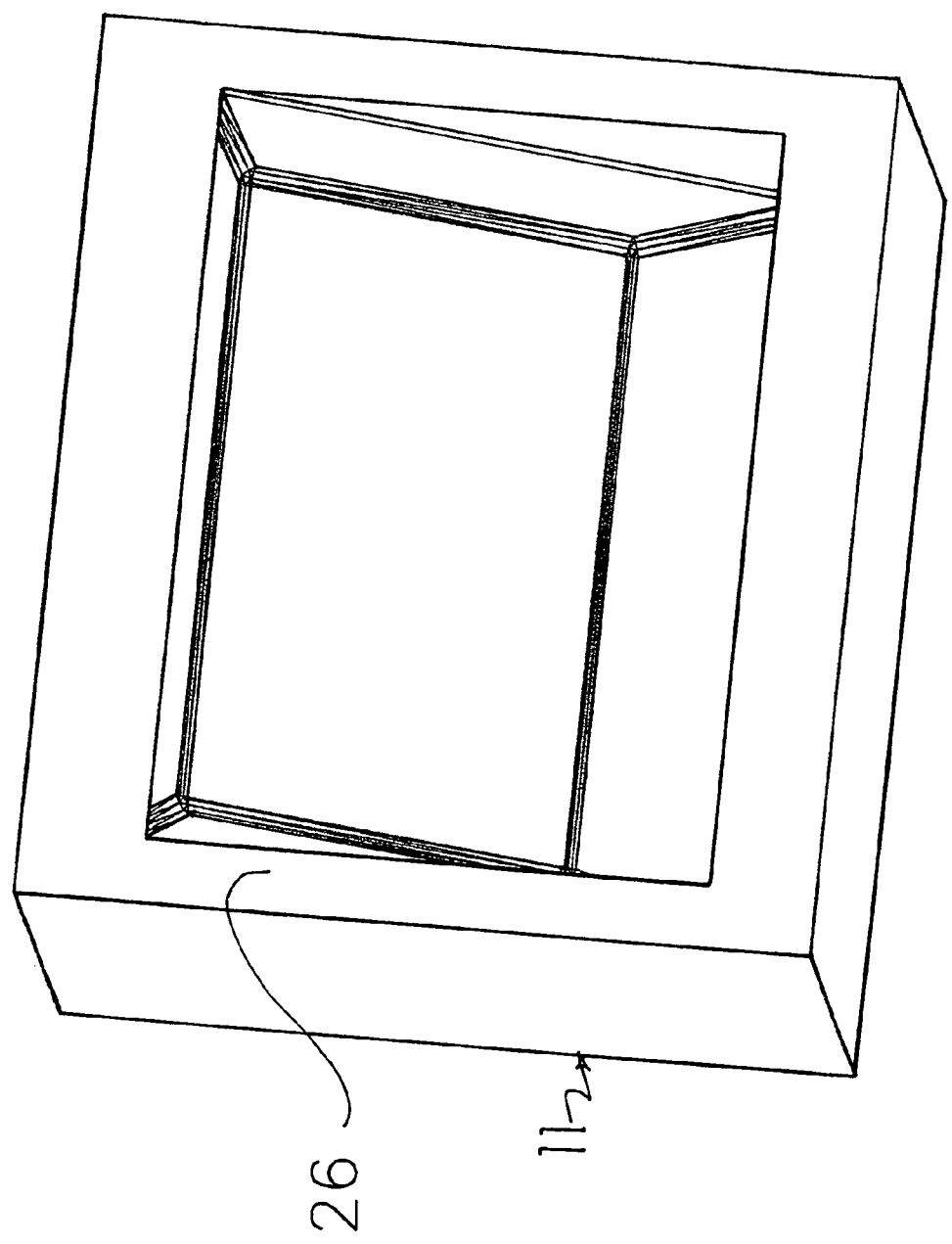

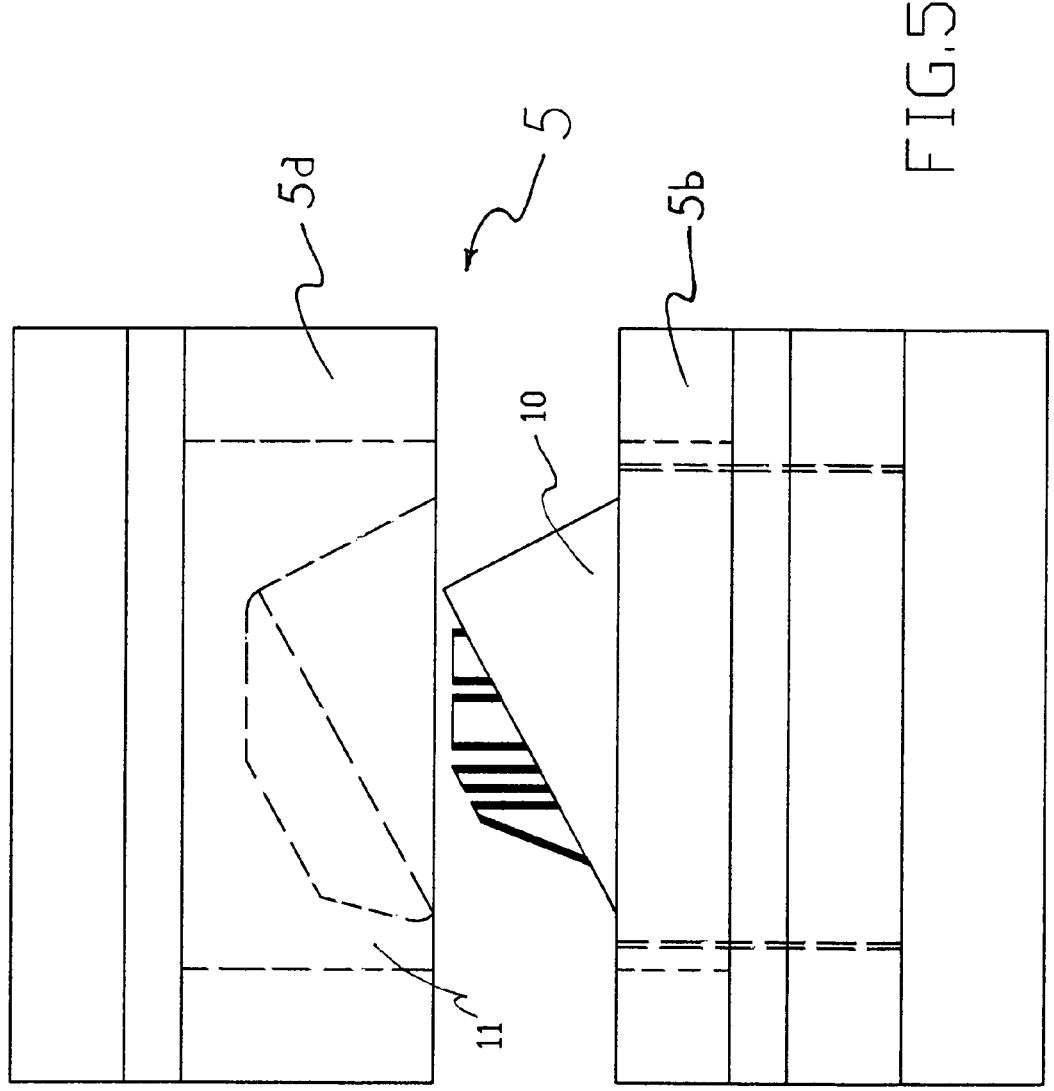

METHOD AND APPARATUS FOR MAKING REFLECTIVE PAVEMENT MARKER

BACKGROUND OF THE INVENTION

1. Field of the Invention

This invention relates to the process of forming the production tooling for injection molding a one-piece reflective pavement markers, in particular, to methods of forming and positioning the precision patterns of the micro prismatic cube corner reflective elements which need to be incorporated within the molding apparatus to monolithically form a one-piece reflective pavement marker.

2. Related Art

Typical fabrication process for making a reflective pavement marker is based on two or three independent steps, each with its own molding or forming apparatus.

Reflective pavement markers are used as lane dividers or guardrail delineators. Other roadway markers are used as temporary lane dividers during roadway repairs.

Since 1965, the most commonly used retro reflective pavement markers are based on Heenan U.S. Pat. No. 3,332,327, Balint U.S. Pat. No. 3,409,344.

Typically, this type of reflective markers are produced in a process consisting of three to five steps: Firstly, injection molding of a thermoplastic shell-like housing, either integrally molded with the prismatic reflective faces utilizing molds with slides, or the reflective faces with its multiple, three dimensional cube corner reflective prisms are injection molded separately, using standard mold, then pre inserted in an injection molding process forming the thin shell-like housing. The shell-like housing firstly coated with metallic sealer to promote reflectivity of the prismatic faces, then filled with resinous epoxy filler material; alternatively, the shell like housing is agglutinated to a hollowed, polymeric structural body forming a reflective pavement marker.

Tooling for the prismatic cube corner reflective elements are positioned within one or two inclined, opposing faces within the core element of the shell like housing mold. Each face is having multiple cube corner reflective elements.

Typically, the core portion of the mold for forming the shell-like housing is provided with slides that move in a third axis, in addition to the x and y direction of the molding apparatus.

This type of molds provides adequate draft and allows the formation of the three cube corner surfaces of each reflective element within the reflective faces without obstruction but with slight deformity and inconsistency in its surface accuracy.

Therefore, variation in retro-reflectivity can be detected among various production patches.

In addition to molding the shell-like housing, a second mold is needed to form a hollowed thermoplastic structural body that would be agglutinated to the shell-like housing to complete a reflective pavement marker.

Alternatively, the shell like housing is sealed with a reflective metallic coat, then a resinous filler material, such as epoxy or urethane filled with inert filler material is used to fill the shell like housing to provide structural backing.

The core and cavity portions of the mold apparatus forming this shell-like housing typically are positioned exactly in the same x and y direction of the open and close direction of the injection machine. Mold slides are provided to offset drafts due to the three dimensional shapes of the cube corner prisms within this apparatus.

Specially electroformed molding portions that define the cube corner reflective elements are normally affixed onto the core segment of this molding apparatus.

While the methods and apparatus described in the aforementioned arts perform effectively in producing good quality reflective pavement markers, a disadvantage of such previous systems is the costly processes and the time involved in assembling the multi-pieces and metal coating the reflective elements of the reflective marker.

Another critical disadvantage in the present arts for forming reflective pavement markers is the inconsistency in forming a precision pattern for the micro-prismatic cube corner reflective elements. Such inconsistency is due to warping and shrinkage factors during the injection molding process that mold approximately an area of about 2.5 to 3.5 square inches with hundreds of cube corner reflective elements; each element with three surfaces perpendicular to each other. Such large surface area with about 0.10-inch thickness tends to have higher deformity due to shrinkage and/or cooling time. This warping reduces the collective retro-reflection of the cube corner reflective elements.

Accordingly, it is desirable to provide a method and apparatus that consistently produces a high quality reflective pavement marker. It is further desirable to provide such a method and apparatus that produce a monolithically formed one piece reflective pavement marker integrally including both, the cube corner reflective elements as well as the structural wall elements that minimize warping of the reflective face, due to dividing the face into small cell like regions.

SUMMARY OF THE INVENTION

The present invention provides a novel methods and apparatus for facilitating monolithic fabrication of low cost, one-piece reflective pavement marker.

Practice of the present inventions uses several steps and apparatus well known in the reflective pavement marker fabrication arts and therefore, not the subject of detail discussion herein.

The present invention further improves over prior arts by providing a method of monolithically forming the cube corner reflective elements in relatively small cell like areas of the reflective faces within the pavement marker, and without the use of apparatus with mold slides which are commonly used in present arts of fabricating pavement markers.

The primary objective of this invention is to provide an apparatus to facilitate a one-step process manufacturing of a reflective pavement marker, while retaining consistent quality for forming the cube corner reflective elements as well as the load carrying structural walls as integral parts of the fabricated reflective pavement marker. Another objective of this invention is to provide an apparatus that can consistently form raised reflective roadway markers having high retro-reflective cube corner prisms. The present invention further provide a method of making apparatus for forming a One-piece raised roadway marker of various desirable shapes and configurations, such as, a marker with truncated body without using slides or using of expensive multi step manufacturing means typically used for making reflective pavement marker.

In accordance with still further aspect of this invention, the apparatus can be made to facilitate molding one or two colors reflective pavement markers.

The present invention provides a method for making an apparatus used for fabricating a reflective pavement comprising:

a) fabricating the electroformed portions of the apparatus, either as an integral part of the apparatus entire core segment or as the upper 0.25 to 0.50 inch segments of the core's protruded and inclined portions;

b) complete the core segment of the apparatus and the corresponding cavity portion, providing adequate cooling configurations within both, the core and cavity segments of the mold;

c) insert and position the core and cavity portion within the base portion of said apparatus, so that the outer inclined core segment that holds the protruding cavity elements defining the reflective faces of the finish product form an angle of about 25 to 35 degrees with respect to the planar base surface of the apparatus being used for fabricating said reflective pavement markers.

BRIEF DESCRIPTION OF THE DRAWINGS

FIG. 2 is a side view of a preferred core segment for the apparatus of the present invention, which is which is incorporating an upper 0.25 to 0.375 inch electroformed inserts for the embossing reflective cube corner elements on at least one face of the fabricated reflective pavement marker, said electroformed inserts are fixed firmly to a lower metallic body;

FIG. 2b is a side view of another preferred core segment, as in FIG. 1, with an entire upper, inclined portion monolithically electroformed for the embossment process;

FIG. 4 is an isometric view of a typical cavity block segment that is incorporated within the apparatus of the present invention;

FIG. 5 is an elevation view of the preferred apparatus of the present invention, incorporating one core and one cavity block segments shown in a simplistic manner.

DESCRIPTION OF THE PREFERRED EMBODIMENTS

Figure 1:
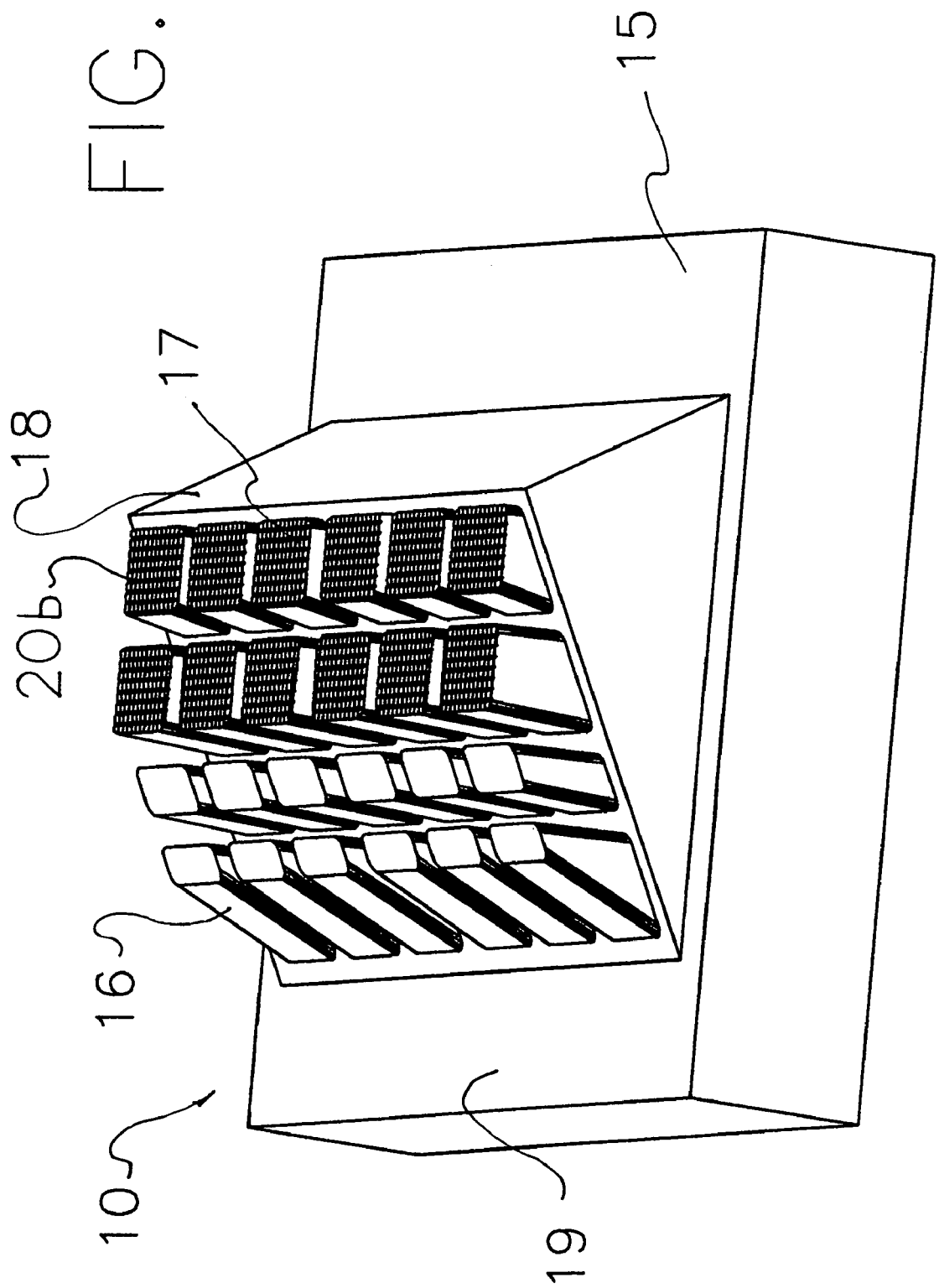
FIG. 1 is an isometric view of one of the preferred core segment for the apparatus of the present invention.

The apparatus of the present invention eliminate several tedious processes or steps for producing reflective pavement markers. In accordance to the process of the present invention, many complex and costly steps in the presently practiced arts of fabricating reflective pavement markers are eliminated; steps, such as metal coating the optical elements of the marker, filling the marker shell with inert filled epoxy or urethane resinous material or welding a unitarily molded structural walls and planar base to a shell-like housing to complete a reflective pavement marker.

The process of the present invention comprises a simple apparatus 5 that provide angular means, which allow forming the entire reflective pavement marker elements, monolithically including its structural body, the optical cube corner reflective elements as well as load carrying, interior partition walls in one-step injection forming cycle.

Referring first to FIGS. 1 through 5, there is shown the apparatus 5 of the present invention, comprises a cavity block half 5a and core block half 5b to which polymeric material is supplied, through specially located plastic runner, to form the desired one-piece reflective pavement marker 30. Molding apparatus 5 incorporates several primary elements, elements such as a core block segment 10 and a cavity block segment 11. An elevation view of molding apparatus 5 is shown in FIG. 5 in a simplistic manner, without incorporating or showing details regarding several additional elements which are normally and necessarily needed to complete a functioning molding apparatus 5; elements such as complete base plates that hold the cavity block 11 and core block 10, the runners through which one or two color liquefied plastic is injected into apparatus 5, cooling-heating means, springs, ejection means, sensors, nuts and bolts, etc. It can be easily shown that the molding apparatus 5 of present invention can incorporate two, four, six, or eight of the cavity-core blocks combination.

Figure 3:
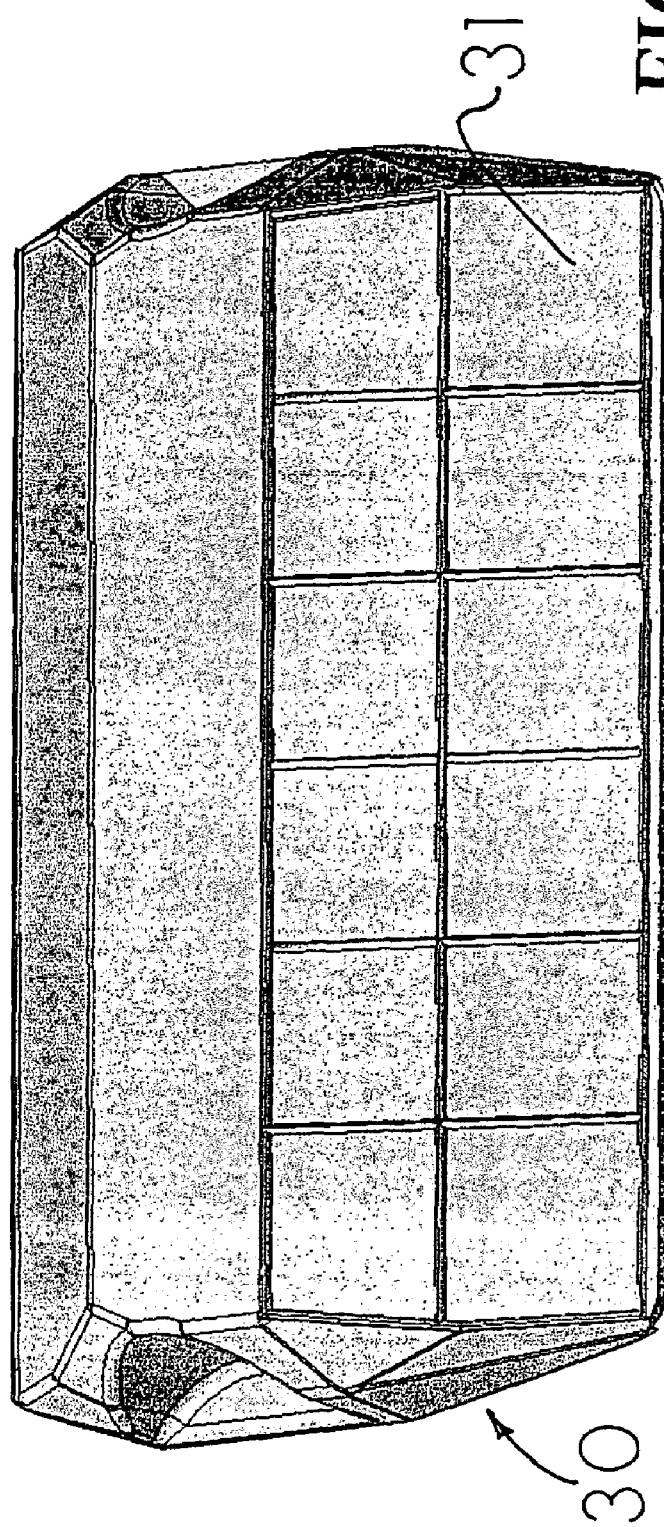
FIG. 3 is an isometric view of a typical one-piece reflective pavement marker that can be fabricated using the apparatus and method of the present invention.

Referring now to FIG. 3, there is shown a typical one-piece reflective pavement marker 30 that can be manufactured utilizing the molding apparatus 5 of the present invention. Marker 30 comprises a monolithically formed structural body that include at least one inclined face 31 which is encompassing an interior cell like surfaces, each includes multiple cube corner reflective elements, integrally formed within cell like areas defined by multiple of load carrying partition walls. Pavement marker 30 can have arcuate or multi-angled sides, each with grip region, planar top and inclined back face.

Various types, sizes or shapes of cube corner reflective prisms can be incorporated as part of the molding apparatus 5 utilized for monolithically producing a one-piece reflective pavement marker 30.

Referring now to FIGS. 1 and 2, there is shown an isometric and elevation views respectively, of a preferred core block segment 10 for the molding apparatus 5. Each core block 10 has upper, protruded surface portions shaped to define and form the interior surface components of the monolithically molded one-piece reflective marker 30, using apparatus 5 of the present invention.

Core block 10 has a lower cubical segment 15, preferably made of hardened steel or aluminum, which is normally inserted and fixed into the upper base plate within the top core block half 5b as part of the male side of molding apparatus 5.

The lower cubical segment 15 has a top planar surface 19 correspond to the open-close surface of apparatus 5. Lower cubical segment 15 is generally provided with cooling shafts to circulate cooling elements, such as water, during production cycles. Such cooling shafts can be extended through the inclined portion 18 of the core block 10 so that cooling process reaches, as close as possible, to the top protruded portions 16 and 17 of said inclined portion 18, thereby cool the three cube corner surfaces of the prisms 20b at the top regions and allow it to release with minimum surface deformity.

FIG. 2 shows the protruded portions 17 having an upper, separately electroformed cell like segments 20, which is attached to each protruded segment 17. Each electroformed segment 20 having multiple prismatic shaped micro cube corners 20b, incorporated for embossing the reflective cube corner elements as an integral parts of the fabricated reflective pavement marker.

Electroforming is defined as the production or reproduction of an article by electrodeposition upon a mandrel (original article) or a mold that is subsequently separated from the electrodeposits. Electroforming is the most accurate mean to reproduce mold parts with great dimensional precision.

FIG. 2b shows the protruded portions 16, 17, 20 as well as the inclined portion 18 to be integrally electroformed as one unitary part of 18b. This monolithic part 18b can be electroformed, from a hard metallic material such as cadmium or nickel-cadmium, thereby retaining accuracy and consistency in the process of making this critical segment of the core block 10, whereby retaining the original designed retro-reflective prisms 20b and having cost effective method for such process.

Protruded portions 16 are incorporated as part of the inclined portion 18 of core block 10 in order to define and subsequently forming multiple partition and load carrying walls within the body portion of the one piece reflective pavement marker 30, being fabricated by means of the present invention. Protruded portions 16 allow the fabrication of said reflective pavement marker 30 with considerably less material and without the need to fill the marker body with structural epoxy or urethane fillers.

The inclined top portion 18 that is positioned in an angle correspondingly to the angle formed between the top planar surface of the reflective marker 30 being fabricated by apparatus 5 and the reflective face 31 thereof.

Protruded segments 16 and 17 are formed with sloped sides having about 1 to 5 degree draft angle provided to ease ejection cycle.

FIG. 4 shows an isometric view of cavity block segment 11, in a simplistic manner and without details for the typical cooling ducts or mounting areas, etc. Cavity block 11 is fixed into cavity block half 5a of apparatus 5 to define the outer surface of the molded reflective marker 30. Cavity block 11 has a top planar surface 26 correspond to the open-close surface 19 within the core block segment 10.

Various means are available to form the cavity block 11, which include conventional machining, EDM or utilizing the CAD-CAM systems.

Various means are available for the injection of the polymeric material into apparatus 5 for the fabrication of the reflective pavement marker 30. Provision can be incorporated into assembling apparatus 5 so that part, such as the reflective pavement marker 30, would have two colors. Alternatively, the reflective pavement marker 30 can be formed with means to inject one transparent color through one runner within apparatus 5, whereas, a second mean is used to surface coat the fabricated pavement marker exterior with an abrasion resistant, opaque topcoat for the body portion of marker 30 and transparent hard coat for the reflective face 31.

The present invention includes within its scope a method for making the apparatus 5 for fabricating a one-piece reflective pavement marker, comprising the steps of:

providing the pavement marker exterior shape and interior structural walls configuration, polymers to be utilized for making said marker, number of cavity 11 and core 10 needed within apparatus 5, and the injection molding method to be utilized, such as a one color injection cycle, two step injection for two color pavement marker, utilizing one screw injection molding machine, or utilizing a multi color injection molding process, which uses an injection molding machine having two screw barrels, providing the means to form the elements for core block 10 and assemble said elements as the male half 5a of apparatus 5. Elements such as 16, 17, 18 and 20 for core block 10 can be formed, either by
a) monolithically electroforming the entire core block 10,
b) the upper portion 18 inclusive 16, 17, and including the top segment 20 with the cube corner reflective prisms 20b, or
c) alternatively, only the upper segment 20 with about 0.375 to 0.50 inch thick portion of the protruded segment 17, including the cube corner reflective prisms 20b, would be electroformed, then mounted firmly to the corresponding regions of the protruded portions 17 of core block 10.

Several materials are suited for electroforming various parts of core block 10, preferably, selecting a bright metallic material, such as cadmium or nickel-cadmium, which would provide sufficient hardness and bright surfaces for making such parts;

insert and position the core and cavity portions within the base plates of said apparatus 6, so that the outer inclined core segment 18 that holds the protruding prismatic elements 20b, defining the interior cell like segments of the reflective face 31 of the fabricated pavement marker 30, form an angle of about 25 to 35 degrees with respect to the planar base surface 19 of the apparatus 5 being used for fabricating said reflective pavement markers.

providing the walls within each protruded segments 16 and 17 a draft angle of about 1 to 10 degrees with respect to the planar base surface 19 of said apparatus 5 to minimize extra material used for fabricating said reflective pavement marker 30 and to allow uninterrupted ejection cycle during the injection molding process of fabricating said reflective pavement marker or delineator.

It is understood that various changes or modifications can be made within the scope of the appended claims to the above-preferred method and apparatus for making one-piece reflective pavement marker without departing from the scope and the spirit of the invention. The principle processes of this invention are not limited to the particular embodiments described herein. Various embodiments can employ the processes of this invention. This invention is not limited to the exact method illustrated and described; alternative methods can be used to form the intended apparatus of this invention for making reflective pavement marker. Therefore, the invention can be practiced otherwise than as specifically described herein.

What is claimed is:

1. A method of making a molding apparatus for fabricating a one-piece reflective pavement marker, said molding apparatus having a cavity portion and a core portion with inclined and protruded prismatic cube corner forming elements, said method comprising the steps:
   a) providing forming means for fabrication of said prismatic cube corner forming elements, said forming elements being attached to a multiple of protruding segments within said core block portion of said apparatus, said core block portion comprising of at least three segments, a lower cubical holding block, an inclined and protruded middle segments attached to said cubical holding block, and an upper prismatic cube corner forming elements, said inclined middle portion includes multiple of protruding segments, said protruding segments are either formed integrally with said prismatic cube corner forming elements, or said protruding segments can have attachments of multiple of pre-electroformed prismatic cube corner forming elements.

* * * * *